United States Patent
Cardalda-Garcia et al.

(10) Patent No.: US 10,666,539 B2
(45) Date of Patent: May 26, 2020

(54) SIGNAL GENERATOR, METHOD AND TEST SYSTEM FOR TESTING A DEVICE UNDER TEST

(71) Applicant: Rohde & Schwarz GmbH & Co. KG, Munich (DE)

(72) Inventors: Adrian Cardalda-Garcia, Munich (DE); Stefan Maier, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 15/365,672

(22) Filed: Nov. 30, 2016

(65) Prior Publication Data

US 2018/0152371 A1 May 31, 2018

(51) Int. Cl.
| | | |
|---|---|---|
| *H04B 17/00* | (2015.01) | |
| *H04L 12/26* | (2006.01) | |
| *H04W 4/06* | (2009.01) | |
| *H04W 64/00* | (2009.01) | |
| *H04L 12/24* | (2006.01) | |

(52) U.S. Cl.
CPC .............. *H04L 43/50* (2013.01); *H04L 43/18* (2013.01); *H04W 4/06* (2013.01); *H04L 41/22* (2013.01); *H04W 64/00* (2013.01)

(58) Field of Classification Search
CPC ......... H04L 2001/0093; H04L 12/1868; H04L 1/1845; H04L 1/1867; H04L 1/1887; H04L 5/0048; H04L 5/0055

See application file for complete search history.

(56) References Cited

U.S. PATENT DOCUMENTS

| | | | | |
|---|---|---|---|---|
| 4,093,960 A | * | 6/1978 | Estes .................... | H04N 17/045 348/182 |
| 4,770,535 A | * | 9/1988 | Kim .................... | G01D 5/35383 250/227.27 |
| 2003/0153273 A1 | * | 8/2003 | Ebert .................... | H04L 1/0001 455/67.14 |
| 2008/0212510 A1 | * | 9/2008 | Larsson .................. | H04L 1/004 370/312 |
| 2009/0016432 A1 | * | 1/2009 | Limberg ............ | H04N 21/2383 375/240.01 |
| 2010/0146357 A1 | * | 6/2010 | Larsson ................ | H04L 1/1845 714/750 |
| 2012/0015657 A1 | * | 1/2012 | Comsa .............. | H04W 52/0206 455/436 |
| 2013/0105567 A1 | * | 5/2013 | Choi .................. | H04N 21/4622 235/375 |
| 2015/0208146 A1 | * | 7/2015 | Younce .............. | H04Q 11/0066 398/21 |

(Continued)

FOREIGN PATENT DOCUMENTS

| | | |
|---|---|---|
| WO | 03/077060 A2 | 9/2003 |
| WO | 2013/169324 A1 | 11/2013 |

*Primary Examiner* — Sai Aung
(74) *Attorney, Agent, or Firm* — Schwabe, Williamson & Wyatt, P.C.

(57) ABSTRACT

A signal generator for broadcasting signals to a device under test is described. Said signal generator comprises a broadcasting unit configured to broadcast a signal and a controller unit configured to send a composite signal to the broadcasting unit. Said composite signal emulates several signals from multiple access points. Further, a method and a test system for testing a device under test are described.

19 Claims, 2 Drawing Sheets

(56) References Cited

U.S. PATENT DOCUMENTS

| | | | |
|---|---|---|---|
| 2015/0234051 A1* | 8/2015 | Moshfeghi | G01S 19/07 342/357.43 |
| 2018/0049052 A1* | 2/2018 | Doshi | H04W 24/06 |

* cited by examiner

SIGNAL GENERATOR, METHOD AND TEST SYSTEM FOR TESTING A DEVICE UNDER TEST

TECHNICAL FIELD

The invention relates to a signal generator for broadcasting signals to a device under test, a method and a test system for testing a device under test.

BACKGROUND OF THE INVENTION

For location based services (LBS), a large number of access points (Wi-Fi, Bluetooth or equivalent technologies) are used wherein data related to the location of a user is required in order to control features corresponding to the dedicated location based service. The several access points may be used to determine the position of the user. For instance, such a system is established by a so-called Wi-Fi Positioning System (WPS). The strength of the signal, the Service Set Identifier (SSID) and/or the media access control address (MAC address) of the several access points may be used for locating the user and providing location based services depending on its location. Generally, the multiple access points transmit individual signals having a certain identification wherein at least some of these individual signals are received by the (mobile) device of the user. The signals received are analyzed, in particular with regard to their strength, such that the location of the user can be identified with respect to the several access points.

In the prior art, a device under test such as a (mobile) device of the user is tested for location based services by simulating a large number of access points which requires a lot of hardware components, for instance multiple radio frequency antennas for establishing multiple radio frequency channels, multiple network cards to simulate the multiple access points and further parts required for establishing the complex test system. Accordingly, a lot of efforts are required for setting up the complex test system. In addition, the costs for testing and establishing the test system are high due to the several hardware components required for testing the device under test and the time required for establishing the test system.

Thus, there is a need for a cost efficient opportunity to test a device under test used for location based services by simulating multiple access points.

SUMMARY OF THE INVENTION

The invention provides a signal generator for broadcasting signals to a device under test, said signal generator comprising a broadcasting unit configured to broadcast a signal and a controller unit configured to forward a composite signal to the broadcasting unit, said composite signal emulating several signals from multiple access points.

Further, the invention provides a method for testing a device under test, with the following steps:
a) providing a signal generator, in particular a signal generator as described above,
b) broadcasting a single composite signal that emulates several signals from multiple access points.

The invention further provides a test system for testing a device under test, said test system comprising a device under test and a signal generator as described above.

The invention is based on the finding that a single composite signal can be used comprising all information about the multiple access points to be simulated, in particular the several signals that would be transmitted by these multiple access points. For instance, these several signals are combined in a single composite signal for an uplink signal. The single composite signal may be replayed by the single signal generator for testing purposes. Thus, only one baseband is needed such that multiple network cards simulating the several access points are no more needed which in turn reduces the costs for testing the device under test significantly. Furthermore, multiple broadcast antennas are no more required since the single composite signal can be transmitted via a single broadcast antenna. Accordingly, the costs of the whole test system can be further lowered.

According to an aspect, said broadcasting unit has one port. This single port is sufficient for transmitting the information about the multiple access points, in particular their corresponding signals, since the single composite signal is transmitted via this single port. The port is connected to the broadcasting unit, in particular directly, wherein the broadcasting unit is also connected to the controller unit. Thus, a connection between the controller unit and the port is established.

According to another aspect, said broadcasting unit is configured to interface with said device under test via a single radio frequency connection. The device under test is tested by the single composite signal transmitted via the broadcasting unit, in particular the single port connected to the broadcasting unit. Several radio frequency connections for testing the device under test are no more required in contrast to typically used multiple-in multiple-out systems (MIMO systems) that have several radio frequency ports interfacing with the device under test. The whole test system can be simplified appropriately. Since the broadcasting unit and the controller unit are connected with each other, the controller unit also interfaces with the device under test via a single radio frequency connection.

Further, said signal generator may comprise a data storage being connected to said controller unit. This data storage is used for storing data which can be used for emulating the several signals from multiple access points. Thus, a data file may be stored in the data storage wherein that data file contains necessary data related to the composite signal.

Particularly, a pre-generated data file is stored in said data storage. The pre-generated data file may comprise data which is related to the composite signal. The data may relate to basic settings being necessary for the testing wherein the data of the data file is adapted manually. The pre-generated data file may be generated by the manufacturer of the signal generator. Alternatively or additionally, the pre-generated data file can be generated by a third party wherein the data file can be installed on the signal generator such that it is stored in the data storage.

Further, said pre-generated data file may be configured to provide said composite signal. Thus, the controller unit processes the pre-generated data file such that the single composite signal is generated. Therefore, the information about the several signals from multiple access points is stored in the single data file which is used for generating the single composite signal. The testing is simplified since the data file has just to be replayed by the signal generator in order to simulate the multiple access points, in particular to perform a certain test scenario. The user of the signal generator may use a file which is already stored on the signal generator, in particular in the data storage. Thus, the user does not have to generate a specific test scenario. Thus, testing the device under test is simplified.

Alternatively or additionally, the signal generator may comprise a data input interface. The data file can be provided via this data input interface which might be a network interface, a universal serial bus (USB) interface and/or a port such that the possibility to transfer the data file is enabled.

According to another aspect, such signal generator comprises an input panel connected to said controller unit. The input panel can be employed by the user of the signal generator for inputting parameters or other data for testing purposes. The user may adapt the already existing pre-generated data file by using the input panel. Alternatively or additionally, the user may create its own new data file related to a certain test scenario by inputting data and/or parameters related to the several signals from multiple access points that are emulated by the single composite signal.

Particularly, said input panel provides a graphical user interface. Thus, the input of data and/or parameters is simplified since the user may just touch on a touch-sensitive display which is used for displaying the graphical user interface. The graphical user interface may be generated by the controller unit or a separate processing unit of the signal generator.

Furthermore, said signal generator may be configured such that parameters received via said input panel are processed by said controller unit in order to generate a multiplexed composite signal based upon said parameters input. Thus, flexibility is provided as the user can input certain specific parameters which are used to generate the composite signal. Further, the user may input parameter that were not considered by the person or company that has generated the pre-generated data file being already installed, for instance.

Said multiplexed composite signal may be said composite signal emulating several signals from multiple access points. Thus, the user may adapt the already existing and stored data file corresponding to a certain test scenario. Alternatively or additionally, the user can generate a completely new data file corresponding to another test scenario.

According to another aspect, said signal generator comprises a protocol tester. This protocol tester allows the user to check whether the device under test has correctly processed the information and/or parameters contained in the composite signal, in particular the several signals contained in the single composite signal. Therefore, the protocol tester captures and analyzes data received with regard to communication protocols. Accordingly, the protocol tester can also be called a protocol analyzer. For instance, the radio link protocol can be tested. In this embodiment, the protocol tester is integrated in the signal generator such that the protocol tester is also located in the same housing as the controller unit, for instance.

Said protocol tester may be connected to outputs of said device under test. It is ensured that the protocol tester can check whether the device under test has interpreted the composite signal and the portions of the composite signal correctly with regard to certain communication protocols, in particular the several signals representing the multiple access points.

Particularly, said protocol tester is connected to said device under test via a link, in particular a cable connection, a radio link, a radio frequency connection and/or a LTE connection. Hence, the data output by the device under test can be received via the link easily.

For testing purposes, said protocol tester may be configured to evaluate data received from said device under test with respect to expected data based upon said composite signal. The protocol tester interprets the data output by the device under test and compares this data with the signal portions of the composite signal transmitted in order to verify if the device under test has processed the different data of the single composite signal correctly, namely as expected.

According to a further aspect, said composite signal comprises at least one of different communication standards, different network standards, different communication protocols and different network protocols, in particular downlink LTE transmitter points, Wi-Fi access points and/or Bluetooth transmitters. The signal generator may use different testing scenarios in order to test the different standards and/or protocols. For instance, LTE, Wi-Fi and/or Bluetooth communication standards and protocols are tested, respectively. Depending on the several signals that are emulated by the composite signal, different transmission standards and/or protocols can be checked simultaneously.

According to another aspect, said controller is further configured to change parameters of said composed signal in order to avoid signal pulses overlapping in time. Thus, it is not necessary to use complex code division multiple access technologies (CDMA technologies) for distinguishing different pulses that overlap in time as it is ensured that the different signal pulses do not overlap in time. The testing of the device under test, in particular the test system used for testing the device under test, is simplified appropriately.

Alternatively or additionally, the signal generator, in particular the controller unit, is configured to use complex code division multiple access technologies (CDMA technologies).

The controller unit may be configured to simulate multiple access points each transmitting an individual signal. Thus, the single composite signal generated by the controller unit corresponds to several individual signals transmitted by the multiple access points.

Furthermore, said signal generator may be a vector signal generator. Thus, the processing of the single composite signal, in particular the generation of the composite signal, is improved as the vector signal generator using digital technologies is capable of generating digitally-modulated signals. A vector signal generator is also called digital signal generator.

According to another embodiment, the test system comprises a protocol tester being separately formed with respect to said signal generator. The protocol tester may have the same characteristics as the one being integrated. However, a separate unit is provided which can be connected with the device under test and/or the signal generator.

BRIEF DESCRIPTION OF DRAWINGS

The invention will now be described with reference to an exemplary embodiment which is shown in the enclosed drawings. In the drawings.

DETAILED DESCRIPTION OF EXAMPLE EMBODIMENT

Figure 1:
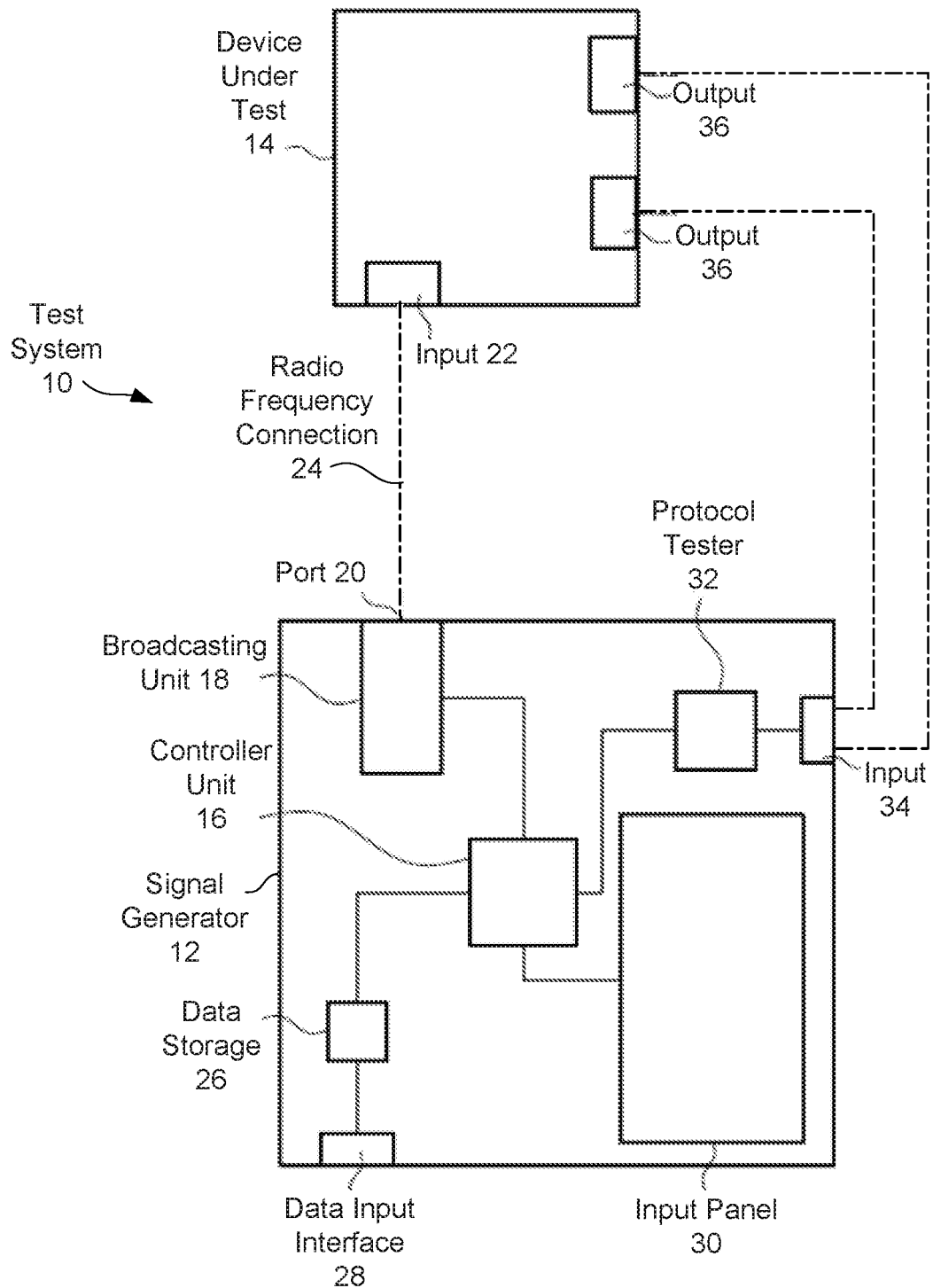
FIG. 1 schematically shows a test system according to the invention.

In FIG. 1, a test system 10 is shown that comprises a signal generator 12 and a device under test 14. The signal generator 12 is used for broadcasting signals to the device under test 14.

The signal generator 12 is configured to transmit a single composite signal which emulates several signals from multiple access points even though only one single generator 12 is used. Accordingly, the composite signal simulates multiple access points.

Moreover, the signal generator 12 comprises a controller unit 16 that is connected to a broadcasting unit 18 used as a port 20 of the signal generator 12. In the shown embodiment, the broadcasting unit 18 comprises a single broadcast antenna that is fed by the controller unit 16.

The controller unit 16 is configured to create a composite signal forwarded to the broadcasting unit 18 that is configured to broadcast that signal such that the signal broadcasted can be received by the device under test 14. The signal output via the port 20 of the signal generator 12 is received by an input 22 of the device under test 14 which disassembles the single composite signal in its different components and processes the components appropriately.

As already mentioned, the controller unit 16 is configured to create the composite signal which emulates several signals from multiple access points such that multiple access points are simulated even though only one signal generator 12 is provided using a single baseband. Thus, the single composite signal is transmitted via the broadcasting unit 18 to the device under test 14 wherein the single composite signal comprises data of several individual signals representing multiple access points even though only a single radio frequency connection 24 is established between the signal generator 12 and the device under test 14 in contrast to multiple-in multiple-out systems (MIMO systems) using several radio frequency connections. Accordingly, the controller unit 16 and the broadcasting unit 18 interface with the device under test 14 via the single radio frequency connection 24.

The composite signal may be created by the controller unit 16 upon data stored in a data storage 26 of the signal generator 12 that is connected to the controller unit 16. Thus, a pre-generated data file can be stored in the data storage 26 wherein the data file is generated by the manufacturer of the signal generator, for instance.

Further, the data storage 26 is connected to a data input interface 28 which enables access to the internet, for instance. Thus, a pre-generated data file can be downloaded from the internet via the data input interface 28 and stored in the data storage 26. Then, the controller unit 16 accesses the data storage 26 in order to generate the composite signal emulating the several signals representing multiple access points.

Alternatively, the data input interface 28 is a port, for instance a universal series bus port (USB port) or any other port enabling to input data to the signal generator 12.

In the shown embodiment, the signal generator 12 also comprises an input panel 30 which can be used to input data or parameters used by the control unit 16 in order to generate the composite signal, in particular a multiplexed composite signal. Hence, the user may generate a new data file by using the input panel 30 or the user just adapts the already existing data file stored in the data storage 26 by using the input panel 30.

Accordingly, the signal generator 12, in particular the controller unit 16, is configured such that parameters and/or data received via the input panel 30 are processed by said control unit 16 in order to generate the multiplexed composite signal based upon the parameters and/or data input manually. Accordingly, the data file may be generated on the fly and replayed by the signal generator 12 appropriately.

The input panel 30 may be a touch-sensitive display providing a graphical user interface that can be controlled by the user easily. The graphical user interface is generated by the controller unit 16 itself or by another processing unit that is not shown.

Furthermore, the signal generator 12 comprises a protocol tester 32 which is connected to an input 34 of the signal generator 12. This input 34 is (wireless) connected to outputs 36 of the device under test 14 such that data processed by the device under test 14 based upon the signal received via the radio frequency connection 24 can be evaluated with respect to the composite signal emulating the several signals from multiple access points.

Accordingly, the protocol tester 32 of the signal generator 12 is connected to the controller unit 16 in order to verify and/or compare the data output with expected data based upon the composite signal representing several individual signals of multiple access points. Thus, communication standards and/or communication protocols can be tested, for instance a radio link protocol.

The protocol tester 32 may be connected to the device under test 14 via a link, in particular a radio link, a cable connection, a radio frequency connection and/or a LTE connection.

In general, the composite signal which simulates the different multiple access points and which further emulates the individual signals transmitted by these access points may comprise at least one of different communication standards, different network standards, different communication protocols and different network protocols, in particular downlink LTE transmitter points, Wi-Fi access points and/or Bluetooth transmitters. Accordingly, the different technology standards and/or communication protocols used for wireless communication can be checked by the test system 10, in particular the protocol tester 32.

Furthermore, the controller unit 16 is configured such that parameters of said composite signal may be changed in order to avoid that different signal pulses overlap in time. Thus, code division multiple access technologies (CDMA technologies) typically used for distinguishing pulses being in time can be avoided which simplifies the testing.

However, the signal generator 12, in particular the controller unit 16, may be configured to use code division multiple access technologies (CDMA technologies) for distinguishing these signals.

Generally, the signal generator 12 can be a digital signal generator which is also called a vector signal generator.

The test system 10 is configured to perform a method wherein the signal generator 12 broadcasts the single composite signal emulating several signals from multiple access points. This single composite signal is generated by the controller unit 16 of the signal generator 12 wherein the controller unit 16 may access a data file being already installed on the signal generator 12, in particular stored in the data storage 26.

Alternatively, the data file is inputted via the data input interface 28 or generated manually by the user when using the input panel 30. Moreover, the already existing data file or the one being inputted via the data input interface 28 is amended by the user while using the input panel 30.

The generated composite signal is forwarded to the broadcasting unit 18 that broadcasts the composite signal which is received by the device under test 14. A single radio frequency connection 24 is used for transmitting the single composite signal. The device under test 14 disassembles the composite signal such that the several components of that signal are processed by the device under test 14.

The processed components of the single composite signal are output via the outputs 36 of the device under test 14 which data output is received by the protocol tester 32 of the signal generator 12 which checks the data output with regard to data expected based upon the signals contained in the composite signal broadcasted.

Figure 2:
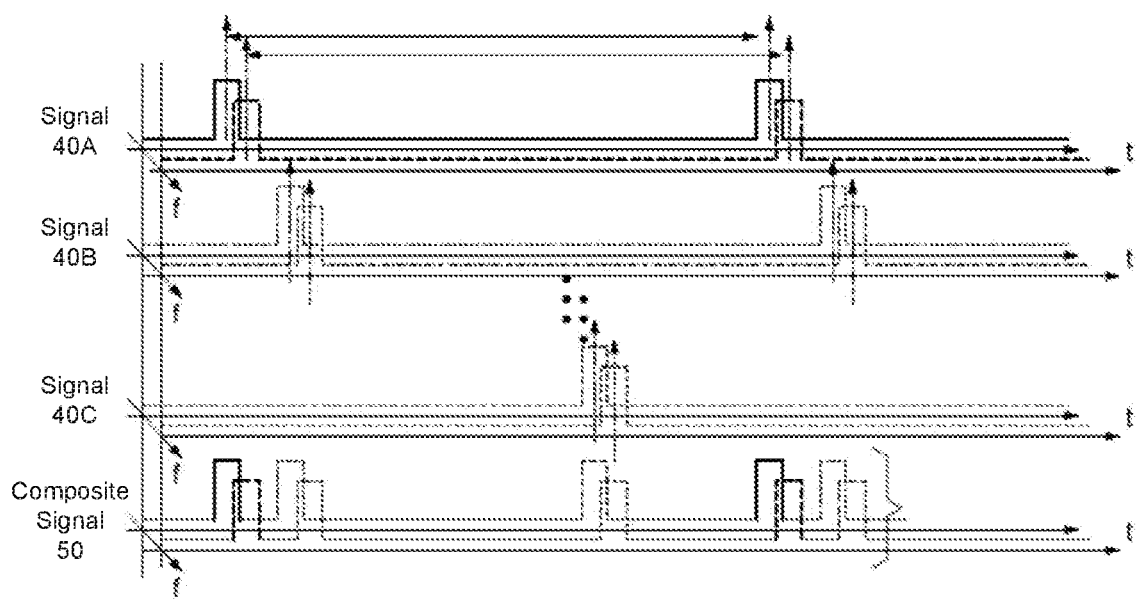
FIG. 2 shows a diagram showing individual signals of different access points compared to a single composite signal used by the signal generator according to the invention.

In FIG. 2, an overview is shown that contains diagrams of different individual signals 40A, 40B, and 40C sent by multiple access points (three upper diagrams) as well as a diagram of a single composite signal 50 (diagram below) that is used by the signal generator 12 for emulating the individual signals 40A, 40B, and 40C of the multiple access points.

As shown in FIG. 2, multiple beacons and multiple frequency channels can be combined while using the single composite signal 50. Accordingly, the single composite signal 50 is an accurate representation of the signals that would be received by the device under test 14 from the multiple access points.

Accordingly, a test system 10, a signal generator 12 and a method for testing a device under test 14 for location based services by simulating multiple access points is provided which simplifies the testing since a complex test system can be avoided.

Moreover, the tests can be performed in a very cost efficient manner because of the simplified test system 10.

Alternatively to the shown embodiment of the test system 10 comprising the signal generator 12 having an integrated protocol tester 32, a test system 10 can be provided having a separately formed protocol tester 32 being not integrated in the housing of the signal generator 12. Thus, the protocol tester 32 is formed as a separate unit that is connected to the signal generator 12 and/or the device under test 14 for testing whether the device under test 14 has processed the information and/or parameters contained in the composite signal correctly, in particular the several signals contained in the single composite signal.

The invention claimed is:

1. A signal generator for broadcasting signals to a device under test, said signal generator being configured to test said device under test for location based services by simulating multiple access points, said signal generator comprising:
   a broadcasting unit configured to broadcast a single composite signal to said device under test, the broadcasting unit having a single broadcast antenna;
   said signal generator comprising a controller unit configured to create said single composite signal which emulates several individual signals that do not come from said multiple access points but are generated by the signal generator to simulate coming from said multiple access points, said single composite signal being a multiplexed composite signal,
   said controller unit configured to forward said single composite signal to the broadcasting unit to broadcast over said single broadcast antenna, and
   said signal generator configured to use a single baseband for transmitting said single composite signal, such that multiple broadcast antennas simulating several access points in a test system are not required.

2. The signal generator according to claim 1, wherein said broadcasting unit has one port.

3. The signal generator according to claim 1, wherein said broadcasting unit is configured to interface with said device under test via a single radio frequency connection.

4. The signal generator according to claim 1, wherein said signal generator comprises a data storage being connected to said controller unit.

5. The signal generator according to claim 4, wherein a pre-generated data file is stored in said data storage.

6. The signal generator according to claim 5, wherein said pre-generated data file is configured to provide said composite signal.

7. The signal generator according to claim 1, wherein said signal generator comprises an input panel connected to said controller unit.

8. The signal generator according to claim 7, wherein said input panel provides a graphical user interface.

9. The signal generator according to claim 7, wherein said signal generator is configured such that parameters received via said input panel are processed by said controller unit in order to generate said multiplexed composite signal based upon said parameters input.

10. The signal generator according to claim 1, wherein said signal generator comprises a protocol tester.

11. The signal generator according to claim 10, wherein said protocol tester is connected to outputs of said device under test, in particular wherein said protocol tester is connected to said device under test via a link, for instance a cable connection, a radio link, a radio frequency connection and/or a LTE connection.

12. The signal generator according to claim 10, wherein said protocol tester is configured to evaluate data received from said device under test with respect to expected data based upon said composite signal.

13. The signal generator according to claim 1, wherein said composite signal comprises at least one of different communication standards, different network standards, different communication protocols, different network protocols, different times, different frequencies and different signal strengths, in particular downlink LTE transmitter points, WIFI access points and/or Bluetooth transmitters.

14. The signal generator according to claim 1, wherein said controller unit is further configured to change parameters of said composite signal in order to avoid signal pulses overlapping in time.

15. The signal generator according to claim 1, wherein said signal generator is a vector signal generator.

16. A method for testing a device under test, for location based services by simulating multiple access points, the method comprising:
   providing a signal generator for broadcasting signals to said device under test, said signal generator comprising a broadcasting unit configured to broadcast a single composite signal to said device under test, said signal generator further comprising a controller unit configured to create said single composite signal which emulates several individual signals that do not come from said multiple access points but are generated by the signal generator to simulate coming from said multiple access points, said controller unit being further configured to forward said composite signal to the broadcasting unit having a single broadcast antenna; and
   broadcasting said single composite signal that emulates said several individual signals from said multiple access points, in order to test said device under test for said location based services by simulating said multiple access points, wherein a single baseband is used to transmit said single composite signal, and wherein said single composite signal is a multiplexed composite signal, such that multiple broadcast antennas simulating several access points in a test system are not required.

17. A test system for testing device under test, comprising:
a device under test and a signal generator for broadcasting signals to a device under test,
said signal generator being configured to test said device under test for location based services by simulating multiple access points,
said signal generator comprising a broadcasting unit having a single broadcast antenna configured to broadcast a single composite signal to said device under test,
said signal generator comprising a controller unit configured to create said single composite signal which emulates several individual signals that do not come from said multiple access points but are generated by the signal generator to simulate coming from said multiple access points,
said single composite signal being a multiplexed composite signal,
said controller unit being configured to forward said single composite signal to the broadcasting unit; and
said signal generator being configured to use a single baseband for transmitting said single composite signal, such that multiple broadcast antennas simulating several access points in a test system are not required.

18. The test system according to claim 17, wherein a protocol tester is provided, said protocol tester being a separate unit with respect to said signal generator.

19. A signal generator for broadcasting signals to a device under test, said signal generator being configured to test said device under test for location based services by simulating multiple access points, said signal generator comprising:
a broadcasting unit configured to broadcast a composite signal to said device under test;
an input panel; and a controller unit connected to said input panel,
said controller unit being configured to process parameters received via said input panel in order to generate the composite signal and forward the composite signal to the broadcasting unit having a single broadcast antenna, said composite signal emulating several signals from multiple access points, said composite signal being a single composite signal of multiple multiplexed frequency channels that do not come from said multiple access points but are generated by the control unit to simulate said multiple access points each transmitting an individual signal, such that multiple broadcast antennas simulating several access points in a test system are not required.

* * * * *